United States Patent
Mills et al.

(10) Patent No.: US 11,170,080 B2
(45) Date of Patent: Nov. 9, 2021

(54) ENFORCING PRIMARY AND SECONDARY AUTHORIZATION CONTROLS USING CHANGE CONTROL RECORD IDENTIFIER AND INFORMATION

(71) Applicant: International Business Machines Corporation, Armonk, NY (US)

(72) Inventors: William A. Mills, Woburn, MA (US); Srishti Arora, Sunnyvale, CA (US); John Behnken, Hurley, NY (US)

(73) Assignee: International Business Machines Corporation, Armonk, NY (US)

( * ) Notice: Subject to any disclaimer, the term of this patent is extended or adjusted under 35 U.S.C. 154(b) by 406 days.

(21) Appl. No.: 16/212,963

(22) Filed: Dec. 7, 2018

(65) Prior Publication Data

US 2020/0184045 A1    Jun. 11, 2020

(51) Int. Cl.
G06F 21/62    (2013.01)
G06F 21/57    (2013.01)
G06F 8/61    (2018.01)
G06F 21/31    (2013.01)

(52) U.S. Cl.
CPC ............... *G06F 21/31* (2013.01); *G06F 8/61* (2013.01)

(58) Field of Classification Search
CPC ... G06F 21/31; G06F 8/61; G06F 8/65; G06F 21/57; G06F 21/6218
See application file for complete search history.

(56) References Cited

U.S. PATENT DOCUMENTS

| | | | |
|---|---|---|---|
| 6,529,784 B1 | 3/2003 | Cantos et al. | |
| 7,698,744 B2 | 4/2010 | Fanton et al. | |
| 10,162,619 B1* | 12/2018 | Lanner | G06F 8/61 |
| 2006/0235737 A1 | 10/2006 | Fleurant et al. | |
| 2008/0092234 A1 | 4/2008 | Circenis | |
| 2015/0131488 A1 | 5/2015 | Martinez et al. | |
| 2017/0177878 A1 | 6/2017 | Adam et al. | |
| 2017/0208428 A1 | 7/2017 | Lim et al. | |
| 2019/0294613 A1* | 9/2019 | Sullivan | H04L 41/0806 |

OTHER PUBLICATIONS

Burton, "Reducing Production Incidents and Outages with Machine Learning," Nov. 18, 2015, LinkedIn, Accessed on Dec. 6, 2018, 9 pp. https://www.linkedin.com/pulse/reducing-production-incidents-outages-machine-learning-stephen-burton/.
"Preventing IT Fires by Managing Change," Applied Trust, Accessed on Dec. 7, 2018, 3 pp., https://www.appliedtrust.com/resources/preventing-it-fires-managing-change.

* cited by examiner

*Primary Examiner* — Nelson S. Giddins
(74) *Attorney, Agent, or Firm* — Yee & Associates, P.C.

(57) ABSTRACT

Enforcing authorization controls for an approved software change on a target system is provided. A user is validated to perform a set of actions. The set of actions performed by the validated user is monitored to determine whether the set of actions conform to an approved process for the approved software change on the target system. A deviation from the approved process is detected based on determining that the set of actions do not conform to the approved process during the monitoring. In response to detecting the deviation from the approved process, an alert is sent regarding the deviation.

20 Claims, 11 Drawing Sheets

ENFORCING PRIMARY AND SECONDARY AUTHORIZATION CONTROLS USING CHANGE CONTROL RECORD IDENTIFIER AND INFORMATION

BACKGROUND

1. Field

The disclosure relates generally to change control management systems and more specifically to enforcing authorization controls for an approved software change on a target system using an identifier of an approved change control record corresponding to the approved software change and other information contained in the approved change control record.

2. Description of the Related Art

Change management ensures that standardized methods and procedures are used for efficient and prompt handling of all changes to control Information Technology (IT) infrastructure, in order to minimize the number and impact of any related incidents upon service. Changes in the IT infrastructure may arise reactively in response to problems or externally imposed requirements, such as, for example, legislative changes, or proactively from seeking improved efficiency and effectiveness, or to enable or reflect business initiatives, or from programs, projects, or service improvement initiatives. Change management can ensure standardized methods, processes, and procedures, which are used for all changes, facilitate efficient and prompt handling of all changes, and maintain the proper balance between the need for change and the potential detrimental impact of changes. Change management is the process of managing planned deployment of alterations to configuration items, such as software, in a configuration management database, which are a part of a business's live production and test environments, along with any other environment that a business wants to have under change management.

A change is an event that is: approved by management; implemented with an acceptable level of risk to the existing IT infrastructure; results in a new status of one or more software components; and provides increased value to the business, such as, for example, increased service performance, increased revenue, avoided costs, and the like, from the use of the enhanced IT infrastructure. Change control reduces the possibility of introducing unnecessary changes to a target system, introducing faults into the target system, or undoing previous software changes to the target system.

SUMMARY

According to one illustrative embodiment, a method for enforcing authorization controls for an approved software change on a target system is provided. A user is validated to perform a set of actions. The set of actions performed by the validated user is monitored to determine whether the set of actions conform to an approved process for the approved software change on the target system. A deviation from the approved process is detected based on determining that the set of actions do not conform to the approved process during the monitoring. In response to detecting the deviation from the approved process, an alert is sent regarding the deviation. According to other illustrative embodiments, a computer system and computer program product for enforcing authorization controls for an approved software change on a target system are provided.

DETAILED DESCRIPTION

Figure 1:
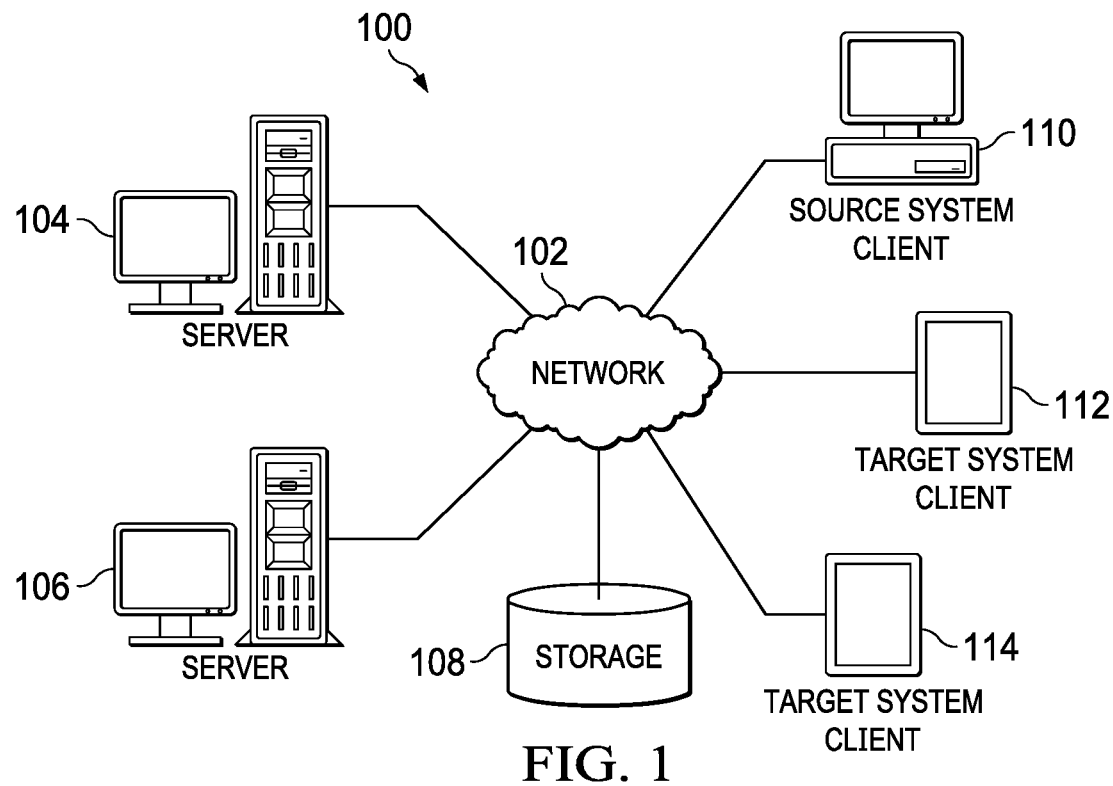
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-5, diagrams of data processing environments are provided in which illustrative embodiments may be implemented. It should be appreciated that FIGS. 1-5 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide software change management services to registered client devices. Also, it should be noted that server 104 and server 106 may each represent a cluster of servers in a data center. Alternatively, server 104 and server 106 may each represent computing nodes in a cloud computing environment that hosts software change management services.

Client 110, client 112, and client 114 also connect to network 102. Clients 110, 112, and 114 are registered clients of server 104 and/or server 106. In this example, source system client 110 is shown as desktop or personal computers with wire communication links to network 102. However, it should be noted that source system client 110 is an example only and may represent other types of data processing systems, such as, for example, a network computer, laptop computer, handheld computer, and the like. In addition, source system client 110 may represent a plurality of different source system clients utilized by different users.

A user, such as, for example, a privileged user, of source system client 110 may utilize source system client 110 to perform an approved software change on target system client 112 or target system client 114. A privileged user is a person that has a job role, such as, for example, a system administrator, with a security clearance to perform software changes on target systems within an enterprise or organization. The approved software change may be, for example, uploading a new software program, such as an operating system, on a target system, updating a previously loaded software program, applying a software patch to a previously loaded software program, and the like. However, it should be noted that server 104 and server 106 manage the software change process by requiring a plurality of user authentication steps, as well as, other information, such as a valid change control record identifier corresponding to the software change, prior to allowing the user to perform the software change on target system client 112 or target system client 114. Target system clients 112 and 114 may be, for example, network switches, routers, firewalls, smart phones, smart watches, smart televisions, smart appliances, gaming devices, kiosks, or any other type of data processing system that executes software.

Storage 108 is a network storage device capable of storing any type of data in a structured format or an unstructured format. In addition, storage 108 may represent a plurality of network storage devices. Further, storage 108 may store identifiers and network addresses for a plurality of different client devices, identifiers for a plurality of different users, a plurality of different change control records, and the like. Furthermore, storage unit 108 may store other types of data, such as authentication or credential data that may include user names, passwords, and biometric templates associated with privileged users, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to source system client 110 over network 102 for use on source system client 110.

In the depicted example, network data processing system 100 may be implemented as a number of different types of communication networks, such as, for example, an internet, an intranet, a local area network (LAN), a metropolitan area network (MAN), a wide area network (WAN), a telecommunications network, or any combination thereof. FIG. 1 is intended as an example only, and not as an architectural limitation for the different illustrative embodiments.

Figure 2:
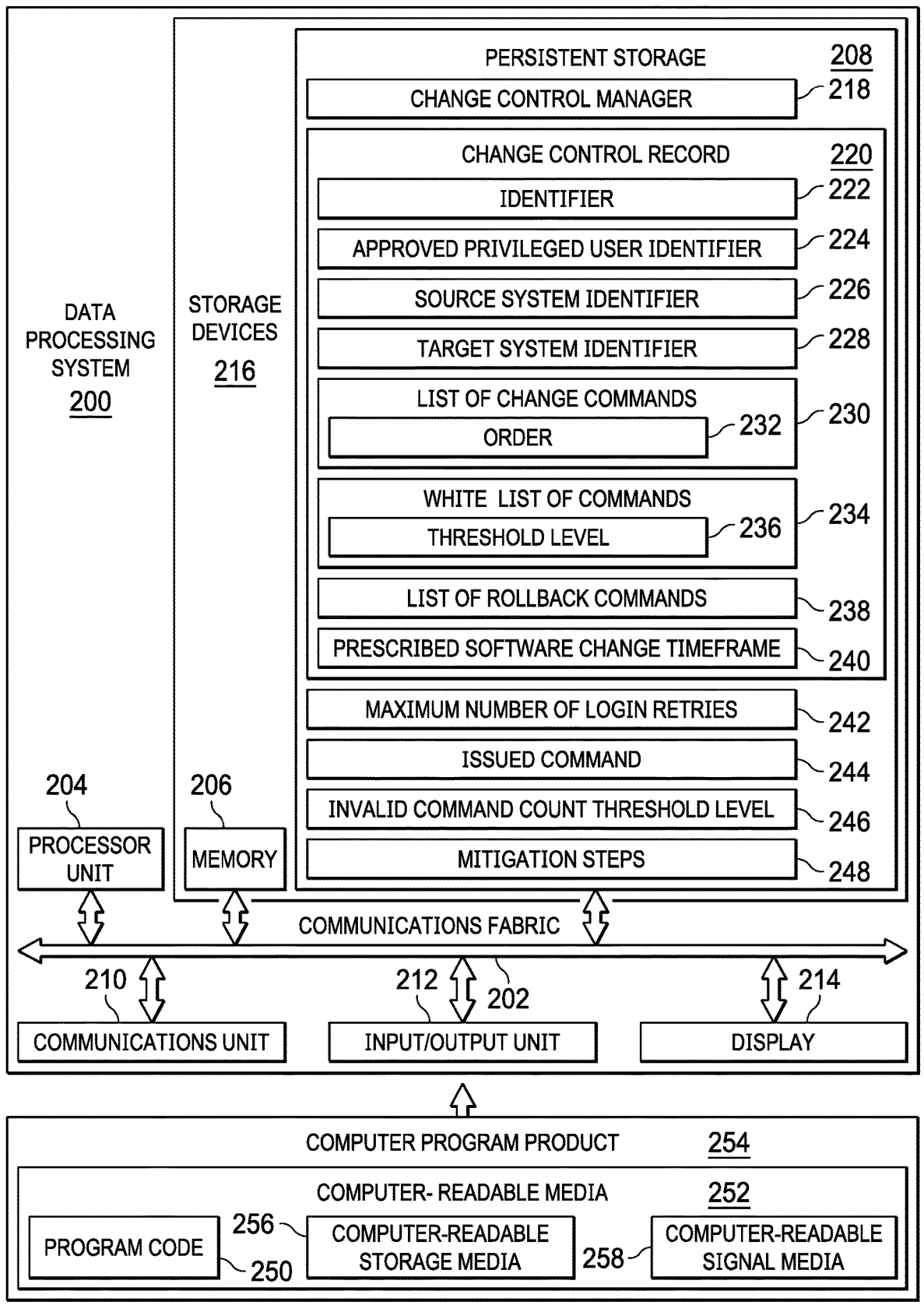
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory (RAM), or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores change control manager 218. However, it should be noted that even though change control manager 218 is illustrated as residing in persistent storage 208, in an alternative illustrative embodiment change control manager 218 may be a separate component of data processing system 200. For example, change control manager 218 may be a hardware component coupled to communication fabric 202 or a combination of hardware and software components. In another alternative illustrative embodiment, a first set of components of change control manager 218 may be located in data processing system 200 and a second set of components of change control manager 218 may be located in one or more other data processing systems, such as, for example, server 106 in FIG. 1.

Change control manager 218 controls the process of enforcing authorization controls for an approved software change on a target system. The approved software change on the target system may be, for example, a software upgrade to a network switch to improve network traffic routing efficiency. Change control record 220 corresponds to the approved software change. However, it should be noted that change control record 220 may represent a plurality of different change control records, which correspond to a plurality of different software changes for a plurality of different target systems. A software developer or subject matter expert, for example, creates change control record 220.

Identifier 222 represents a unique identifier, such as, for example, an alphanumeric sequence, which corresponds to change control record 220 only. Approved privileged user identifier 224 represents a unique identifier for a set of one or more privileged users who are approved to perform the approved software change on the target system. Source system identifier 226 represents a unique identifier for a secure source system, such as, for example, source system client 110 in FIG. 1, from which the approved privileged user may perform the approved software change on the target system.

Target system identifier 228 represents a unique identifier for the target system, such as, for example, target system client 112 in FIG. 1, where the approved privileged user is to perform the approved software change. List of change commands 230 represents a list of tested software change commands corresponding to the approved software change on the target system. Order 232 represents the correct sequence of the tested software change commands included in list of change commands 230.

White list of commands 234 include supplemental or off script commands, such as, for example, generate a directory command, which are not included in list of change commands 230, but are permissible commands. Threshold level 236 represents a predefined maximum number of white list commands that change control manager 218 may execute. In other words, if threshold level 236 is met or exceeded, then change control manager 218 terminates the software change session.

List of rollback commands 238 represents a list of rollback commands to return the target system to a state prior to initiation of the software change in response to the software change failing or when change control manager 218 is unable to validate the software change on the target device. Prescribed software change timeframe 240 represents a time period or window within which change control manager 218 will permit the software change to be performed on the target device. In other words, if the software change is not performed within prescribed software change timeframe 240, then change control manager 218 will prevent the software change from being performed on the target device.

Maximum number of login retries 242 represents the predefined maximum number of allowed privileged user login retry attempts before change control manager 218 raises security alerts and prevents privileged user login. Issued command 244 represents a command that the privileged user issued from the source system to perform the software change on the target system. It should be noted that issued command 244 may represent a series of different issued commands. Change control manager 218 compares each issued command 244 with commands within list of change commands 230, white list of commands 234, and list of rollback commands 238 to determine whether each issued command 244 is included in one of these lists. In addition, change control manager 218 determines whether each issued command 244 complies with order 232.

Invalid command count threshold level 246 represents a predefined maximum number of invalid commands that may be issued by the privileged user before change control manager 218 terminates the software change session. Mitigation steps 248 represent a set of one or more mitigation action steps that change control manager 218 may perform in response to the privileged user issuing invalid commands or change control manager 218 terminating the software change session due to input of invalid authentication credentials or invalid change control record identifier, for example. The set of action steps may include, for example, displaying a warning to the privileged user regarding invalid commands with context information, sending an alert to an operations team and/or a security information and event manager regarding login failure with context information, logging off the privileged user, and the like.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, short-wave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 250 is located in a functional form on computer readable media 252 that is selectively removable and may be loaded onto or transferred to data processing system 200 for running by processor unit 204. Program code 250 and computer readable media 252 form computer program product 254. In one example, computer readable media 252 may be computer readable storage media 256 or computer readable signal media 258. Computer readable storage media 256 may include, for example, an optical or magnetic disc that is inserted or placed into a drive or other device that is part of persistent storage 208 for transfer onto a storage device, such as a hard drive, that is part of persistent storage 208. Computer readable storage media 256 also may take the form of a persistent storage, such as a hard drive, a thumb drive, or a flash memory that is connected to data processing system 200. In some instances, computer readable storage media 256 may not be removable from data processing system 200.

Alternatively, program code 250 may be transferred to data processing system 200 using computer readable signal media 258. Computer readable signal media 258 may be, for example, a propagated data signal containing program code 250. For example, computer readable signal media 258 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 250 may be downloaded over a network to persistent storage 208 from another device or data processing system through computer readable signal media 258 for use within data processing system 200. For instance, program code stored in a computer readable storage media in a data processing system may be downloaded over a network from the data processing system to data processing system 200. The data processing system providing program code 250 may be a server computer, a client computer, or some other device capable of storing and transmitting program code 250.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 256 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

It is understood that although this disclosure includes a detailed description on cloud computing, implementation of the teachings recited herein are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the service's provider. Broad network access provides for capabilities that are available over a network and accessed through standard mechanisms that promote use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Figure 3:
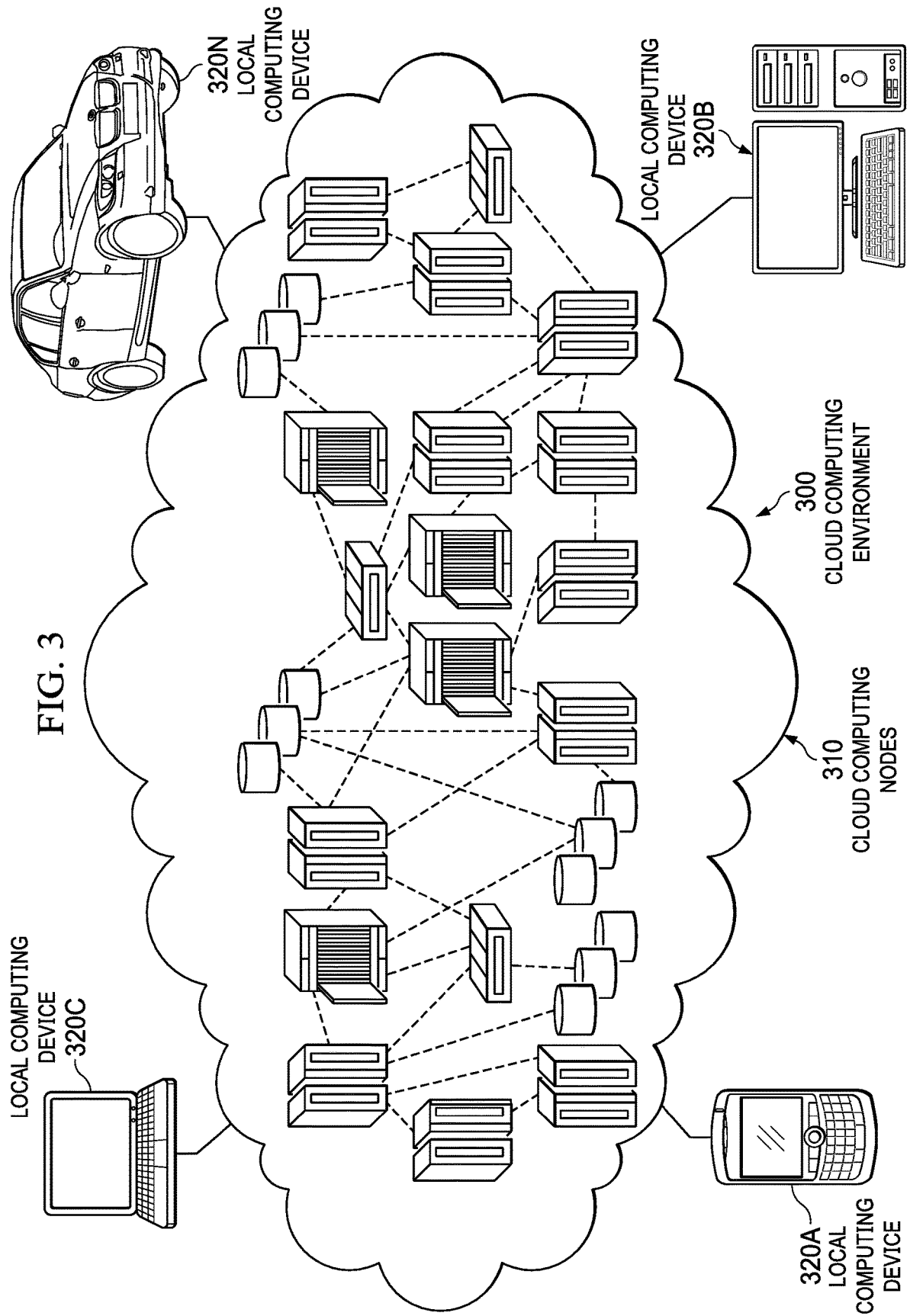
FIG. 3 is a diagram illustrating a cloud computing environment in which illustrative embodiments may be implemented.

With reference now to FIG. 3, a diagram illustrating a cloud computing environment is depicted in which illustrative embodiments may be implemented. In this illustrative example, cloud computing environment 300 includes a set of one or more cloud computing nodes 310 with which local computing devices used by cloud consumers, such as, for example, personal digital assistant or a smart phone 320A, desktop computer 320B, laptop computer 320C, and/or automobile computer system 320N, may communicate. Cloud computing nodes 310 may be, for example, server 104 and server 106 in FIG. 1. Local computing devices 320A-320N may be, for example, clients 110-114 in FIG. 1.

Cloud computing nodes 310 may communicate with one another and may be grouped physically or virtually into one or more networks, such as private, community, public, or hybrid clouds as described hereinabove, or a combination thereof. This allows cloud computing environment 300 to offer infrastructure, platforms, and/or software as services for which a cloud consumer does not need to maintain resources on a local computing device, such as local computing devices 320A-320N. It is understood that the types of local computing devices 320A-320N are intended to be illustrative only and that cloud computing nodes 310 and cloud computing environment 300 can communicate with any type of computerized device over any type of network and/or network addressable connection using a web browser, for example.

Figure 4:
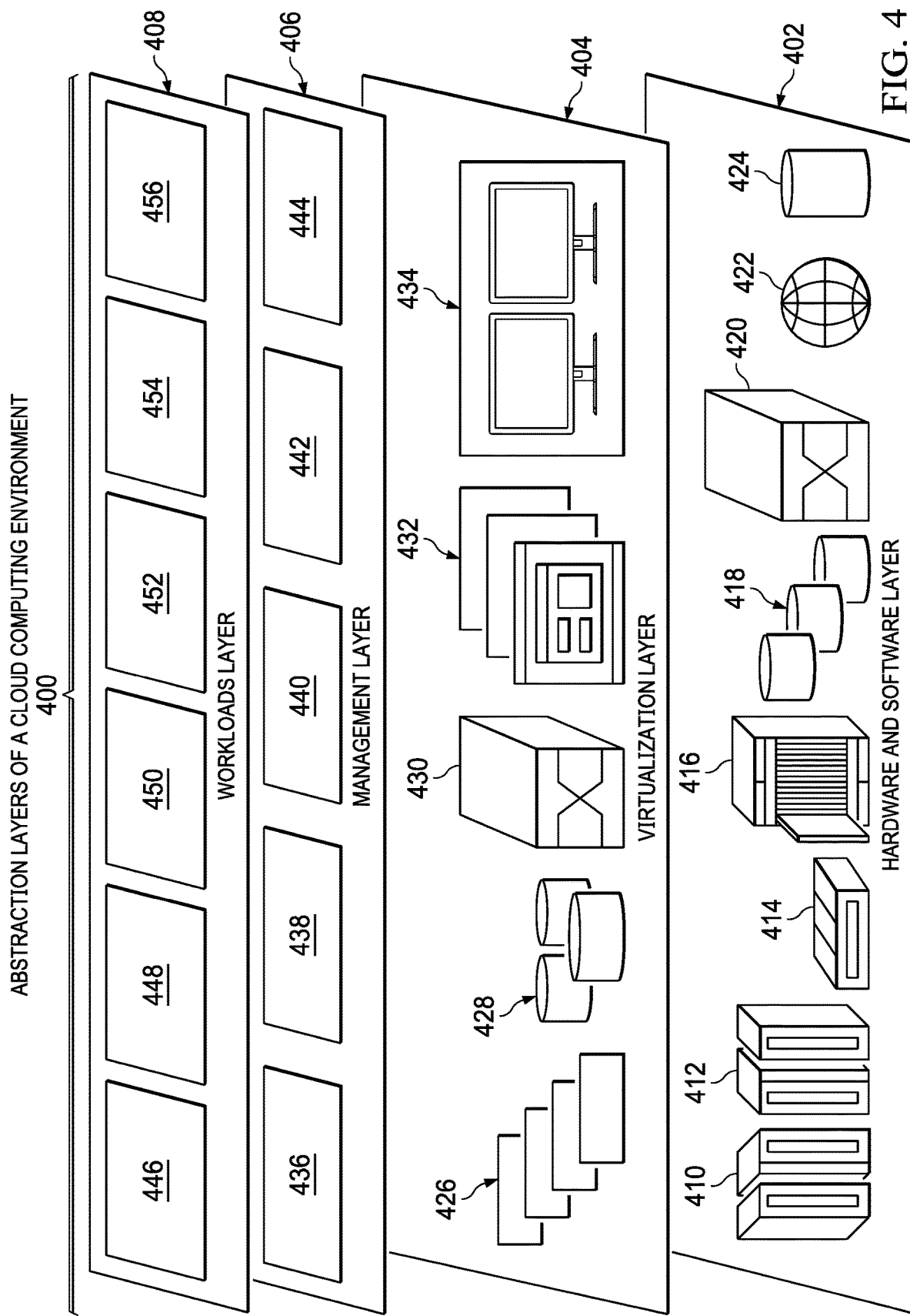
FIG. 4 is a diagram illustrating an example of abstraction layers of a cloud computing environment in accordance with an illustrative embodiment.

With reference now to FIG. 4, a diagram illustrating abstraction model layers is depicted in accordance with an illustrative embodiment. The set of functional abstraction layers shown in this illustrative example may be provided by a cloud computing environment, such as cloud computing environment 300 in FIG. 3. It should be understood in advance that the components, layers, and functions shown in FIG. 4 are intended to be illustrative only and embodiments of the invention are not limited thereto. As depicted, the following layers and corresponding functions are provided.

Abstraction layers of a cloud computing environment 400 include hardware and software layer 402, virtualization layer 404, management layer 406, and workloads layer 408. Hardware and software layer 402 includes the hardware and software components of the cloud computing environment. The hardware components may include, for example, mainframes 410, RISC (Reduced Instruction Set Computer) architecture-based servers 412, servers 414, blade servers 416, storage devices 418, and networks and networking components 420. In some illustrative embodiments, software components may include, for example, network application server software 422 and database software 424.

Virtualization layer 404 provides an abstraction layer from which the following examples of virtual entities may be provided: virtual servers 426; virtual storage 428; virtual networks 430, including virtual private networks; virtual applications and operating systems 432; and virtual clients 434.

In one example, management layer 406 may provide the functions described below. Resource provisioning 436 provides dynamic procurement of computing resources and other resources, which are utilized to perform tasks within the cloud computing environment. Metering and pricing 438 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 440 provides access to the cloud computing environment for consumers and system administrators. Service level management 442 provides cloud computing resource allocation and management such that required service levels are met. Service level agreement (SLA) planning and fulfillment 444 provides pre-arrangement for, and procurement of, cloud computing resources for which a future requirement is anticipated in accordance with an SLA.

Workloads layer 408 provides examples of functionality for which the cloud computing environment may be utilized. Example workloads and functions, which may be provided by workload layer 408, may include mapping and navigation 446, software development and lifecycle management 448, virtual classroom education delivery 450, data analytics processing 452, transaction processing 454, and software change control management 456.

In the course of developing illustrative embodiments, it was discovered that a number of issues exist with current change control systems. For example, no way currently exists to prevent an unintended or unauthorized action when a privileged user, such as a system administrator, is implementing a software change (e.g., operating system change) in a target cloud environment or computing system. In addition, no way currently exists to monitor or ensure that a software change is made according to an approved change control record, which contains the steps needed to implement the change correctly. Further, no way currently exists to prevent a privileged user from making an arbitrary software change without first requiring input of an approved change control record identifier (e.g., a valid change control record identifier is required for privileged user login before a software change is allowed). Furthermore, no real-time notification for deviations from the approved change control record are currently made by existing change control systems. Moreover, no validation of software change commands (e.g., missing or incorrect software change commands can damage a computing system) is currently made by existing change control systems. Also, no way currently exists to ensure that the steps contained within the approved change control record are followed in the correct order or sequence, which may result in a failed software roll out. In addition, no way currently exists to ensure that a software change occurs within a prescribed or specified timeframe. Further, no way currently exists to ensure that a software change occurs on a target system from an approved secure source system.

Illustrative embodiments generate a terminal command shell on a target system for controlling software changes by privileged users on the target system using additional authentication factors that are hooked into the operating system of the target system. For example, illustrative embodiments will not allow a privileged user to log in without an identifier of an approved change control record, the privileged user being approved to perform a particular software change (e.g., valid privileged user identifier), that particular software change is being performed on a correct target system (e.g., correct target system identifier), the privileged user is logging in from an approved secure source system (e.g., valid secure source system identifier), and the privileged user is performing the software change within the prescribed timeframe. Once the privileged user is logged in to the target system, the change control system evaluates each change command issued by the privileged user in the terminal command shell by comparing each issued change command with the command steps contained in the approved change control record corresponding to the change control record identifier. Failure to correctly follow the approved change control record steps will result in illustrative embodiments sending an alert to the privileged user regarding the variance or deviation from the approved change control record, a notification to an operations team, and possibly terminating the session corresponding to the privileged user log in.

Illustrative embodiments enforce a white list of supplemental commands, such as, for example, generate a directory command, using a deviation threshold level. For example, illustrative embodiments monitor and count the number of issued commands the change control system executes off script (e.g., issued commands that are not contained in the approved change control record, but are included in the supplemental command white list) to determine whether the number of executed off script issued commands exceeds the deviation threshold level. The deviation threshold level is a predefined number, such as, for example, zero ("0") or "N" number (e.g., 1, 2, 3, 4, 5, 10, 20, and the like) of executed off script issued commands. If illustrative embodiments find any of the initial privileged user log in attributes (e.g., change control record ID, privileged user ID, secure source system ID, target system ID, or software change timeframe) to be incorrect, or illustrative embodiments subsequently find that the privileged user is not following the approved change control record command steps in the correct order or that executed off script issued commands exceed the deviation threshold level, then illustrative embodiments warn the privileged user of any deviation from the approved change control record steps within the predefined deviation threshold level, automatically log off the privileged user when executed off script issued commands exceed the predefined threshold deviation threshold level, and issue real-time alerts to an approver of the change control record and a security information and event management system. Optionally, illustrative embodiments may send real-time alerts to an operations team and/or an approver of the software change via, for example, a messaging system, such as a pager system, an e-mail system, a small message service system, a team collaboration service system, or the like. Furthermore, illustrative embodiments are able to account for special software change attributes in a change request ticket to override normal deviation thresholds in the event of an emergency situation.

Thus, illustrative embodiments are capable of preventing privileged users from performing software changes to target systems outside the bounds of the formal change management process, which includes inadvertent mistakes by authorized privileged users that may disrupt software changes on target systems, as well as attempts to disrupt target systems by unauthorized malicious users. Illustrative embodiments receive a new change control record with needed information, such as, for example, identifier of the change control record, identifier of a valid secure source system, list of software change control commands, an identifier of an approved software change executor (e.g., approved privileged user), an identifier of a target system where a software change will be executed, a white list of supplemental commands, a predefined supplemental command white list threshold level, a list of rollback commands for when validation of a software change fails, and a specified timeframe (e.g., allowed beginning date and time and end date and time) for an approved software change. Illustrative embodiments utilize the change control record to make sure the software change is approved and that the software change control process is followed correctly.

Illustrative embodiments perform an authentication process using the attributes of the new change control record corresponding to the approved software change. When a privileged user is attempting to log in to a target system where the approved software change is to be executed, illustrative embodiments prompt the privileged user for login credentials, such as username and password. Illustrative embodiments hook the log in process in an authentication module of an operating system or other similar authentication module or system, for example, for further authentication. After validating the login credentials, illustrative embodiments prompt the privileged user for a valid change control record identifier corresponding to the approved software change. Upon receiving the change control record identifier, illustrative embodiments call a change control manager application programming interface to determine whether the received change control record identifier is valid. Illustrative embodiments pass information, such as privileged user identifier corresponding to the login, secure source system identifier corresponding to the login, and the received change control record identifier, to the change control manager application programming interface. The change control manager application programming interface calls back to the target system to get the information needed to determine whether the login can occur. For example, the change control manager application programming interface checks the privileged user identifier, secure source system identifier, and the change control record identifier.

Afterward, the change control manager application programming interface calls back to the target system that the login is allowed to proceed forward when the change control manager application programming interface determines that the received change control record attributes are valid. If the change control manager application programming interface determines that this is not a valid login request, then the login fails with a software change error on the target system and the change control manager application programming interface sends an alert to all registered alert adapters or handlers. Further, the change control manager application programming interface also returns information regarding the list of commands, which is contained in the approved change control record.

Subsequently, the change control manager executes the software change commands on the target system and validates that the software change commands are in scope of the approved change control record, which corresponds to the received change control record identifier. As the change control manager receives each software change command issued by the privileged user on the secure source system, a command interpreter of the change control manager determines whether an issued command is located in the list of commands contained in the approved change control record, which is stored in a change control system. If the issued command is not in the list of commands contained in the approved change control record, then the change control manager determines whether the issued command is contained in a white list of supplemental commands. The change control manager also determines whether the issued command will be executed in the correct command sequence. If the issued command will not be executed in the correct sequence or the issued command is not in the list of commands, then the change control manager logs out the privileged user and terminates the session. The change control manager records the set of issued commands that were executed and sends any command exception to a corresponding alerting adapter or handler.

Figure 5:
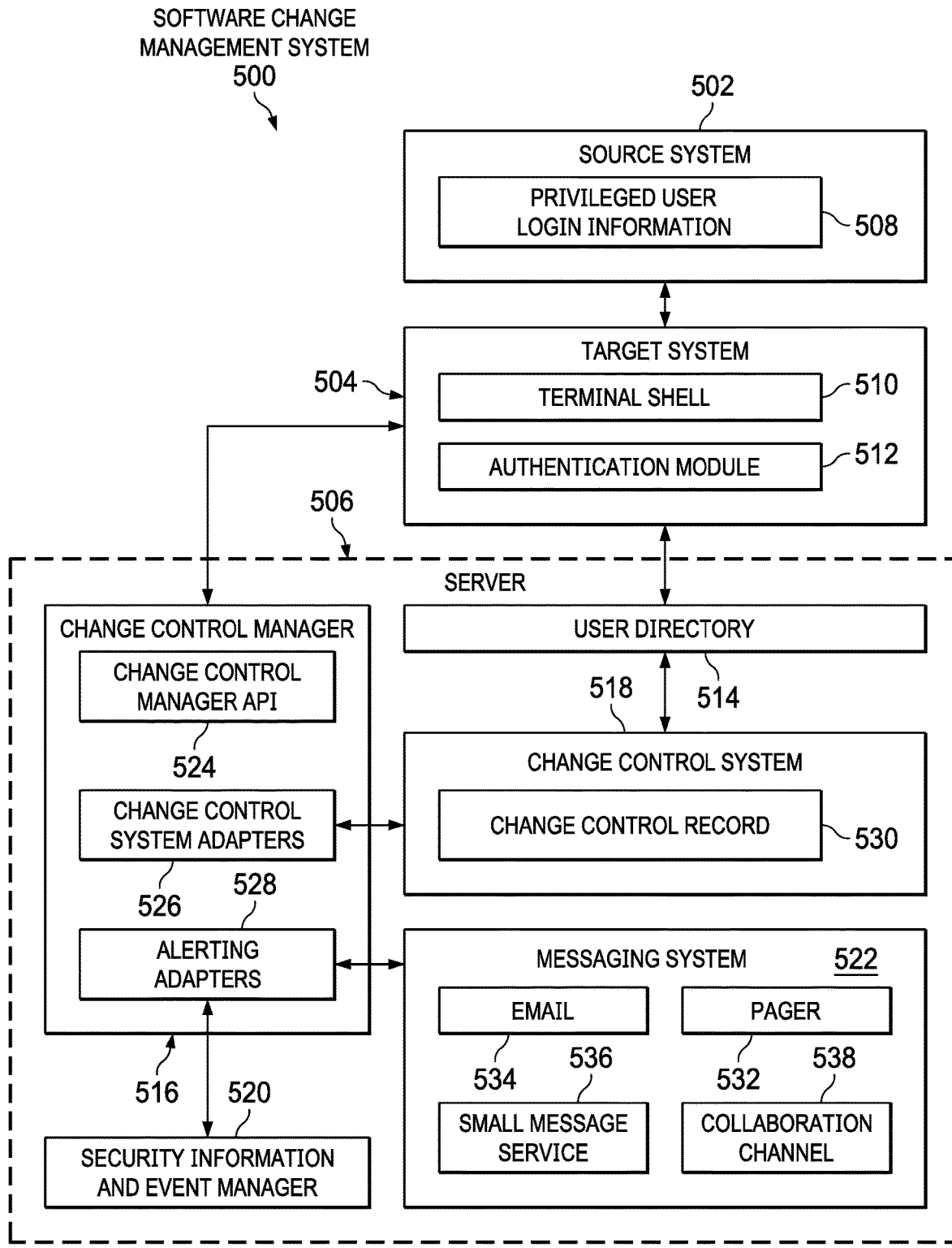
FIG. 5 is a diagram illustrating an example of a software change management system in accordance with an illustrative embodiment.

With reference now to FIG. 5, a diagram illustrating an example of a software change management system is depicted in accordance with an illustrative embodiment. Software change management system 500 may be implemented in a network of data processing systems, such as network data processing system 100 in FIG. 1, or a cloud computing environment, such as cloud computing environment 300 in FIG. 3. Software change management system 500 is a system of hardware and software components for enforcing authorization controls for an approved software change on a target system using an identifier of a change control record corresponding to the approved software change and other information contained in the change control record.

In this example, software change management system 500 includes source system 502, target system 504, and server 506. Source system 502 may be, for example, source system client 110 in FIG. 1 or local computing device 320B in FIG. 3. Target system 504 may be, for example, target system client 112 in FIG. 1 or local computing device 320N in FIG. 3. Server 506 may be, for example, server 104 in FIG. 1, data processing system 200 in FIG. 2, or a cloud computing node in cloud computing nodes 310 in FIG. 3. However, it should be noted that software change management system 500 is intended as an example only and not as a limitation on illustrative embodiments. In other words, software change management system 500 may include any number and type of source systems, target systems, and servers.

Source system 502 is a secure device that a privileged user utilizes to perform an approved software change, such as an operating system upgrade, on target system 504. Thus, target system 504 is the intended recipient of the software change. Target system 504 may represent any type of data processing system that includes software programs or applications for performing a set of operations or tasks.

The privileged user inputs privileged user login information 508 into terminal shell 510 for authentication by authentication module 512 and server 506. Terminal shell 510 is an application that allows the privileged user to communicate with target system 504. Authentication module 512 is a mechanism to integrate multiple low-level authentication schemes into a high-level application programming interface. For example, authentication module 512 may check that a specified account is a valid authentication target under current conditions. This may include conditions such as account expiration, time of day, and that the user has access to the requested service. Authentication service 512 may also verify the user's identity by, for example, requesting and verifying username and password and other secrets such as an authentication token, a biometric sample, and the like. A software change session starts after the privileged user has been successfully authenticated.

Server 506 is a change control system computer that includes a plurality of components. In this example, the plurality of components includes user directory 514, change control manager 516, change control system 518, security information and event manager 520, and messaging system 522. In addition, user directory 514, change control manager 516, change control system 518, security information and event manager 520, and messaging system 522 may each represent a different virtual machine executing on server 506. However, it should be noted that server 506 is intended as an example only and not as a limitation on different illustrative embodiments. In other words, one or more of the components shown in server 506 may be located in one or more other servers, such as server 106 in FIG. 1, or distributed among cloud computing nodes in cloud computing nodes 310 in FIG. 3.

Also in this example, change control manager 516 includes change control manager application programming interface 524, change control system adapters 526, and alerting adapters 528. Change control manager 516 may be, for example, change control manger 218 in FIG. 2. Change control system 518 includes change control record 530, such as, for example, change control record 220 in FIG. 2. Messaging system 522 includes pager 532, email 534, small message service 536, and collaboration channel 538. However, messaging system 522 may include more or fewer types of messaging than illustrated.

Authentication module 512 calls user directory 514 to validate an identifier of the privileged user during login. In addition, authentication module 512 calls change control manager application programming interface 524 to validate the change control record identifier, privileged user identifier, source system identifier, target system identifier, and issued commands received from source system 502. In turn, change control manager application programming interface 524 calls change control system 518 to validate the received change control record identifier, privileged user identifier, source system identifier, target system identifier, and issued commands. Change control system 518 validates the received change control record identifier, privileged user identifier, source system identifier, target system identifier, and issued commands using the information contained within change control record 530. It should be noted that change control system 518 also calls user directory 514 to valid the privileged user identifier. Also, it should be noted that change control record 530 corresponds to the approved software change on target system 504. However, change control record 530 may represent a plurality of different change control records that correspond to a plurality of different approved software changes for a plurality of different target systems.

Upon validation of the received information by change control system 518, change control system adapters 526 execute the issued commands on target system 504. If change control system 518 cannot validate one or more of the received information, then alerting adapters 528 call security information and event manager 520 to record the authentication failure, along with a reason for the failure (e.g., invalid change control record identifier). Further, alerting adapters 528 call messaging system 522 to send realtime alerts to a security analyst and/or operations team via one or more of pager 532, email 534, small message service 536, and collaboration channel 538 for review and possible action.

Figure 6A:
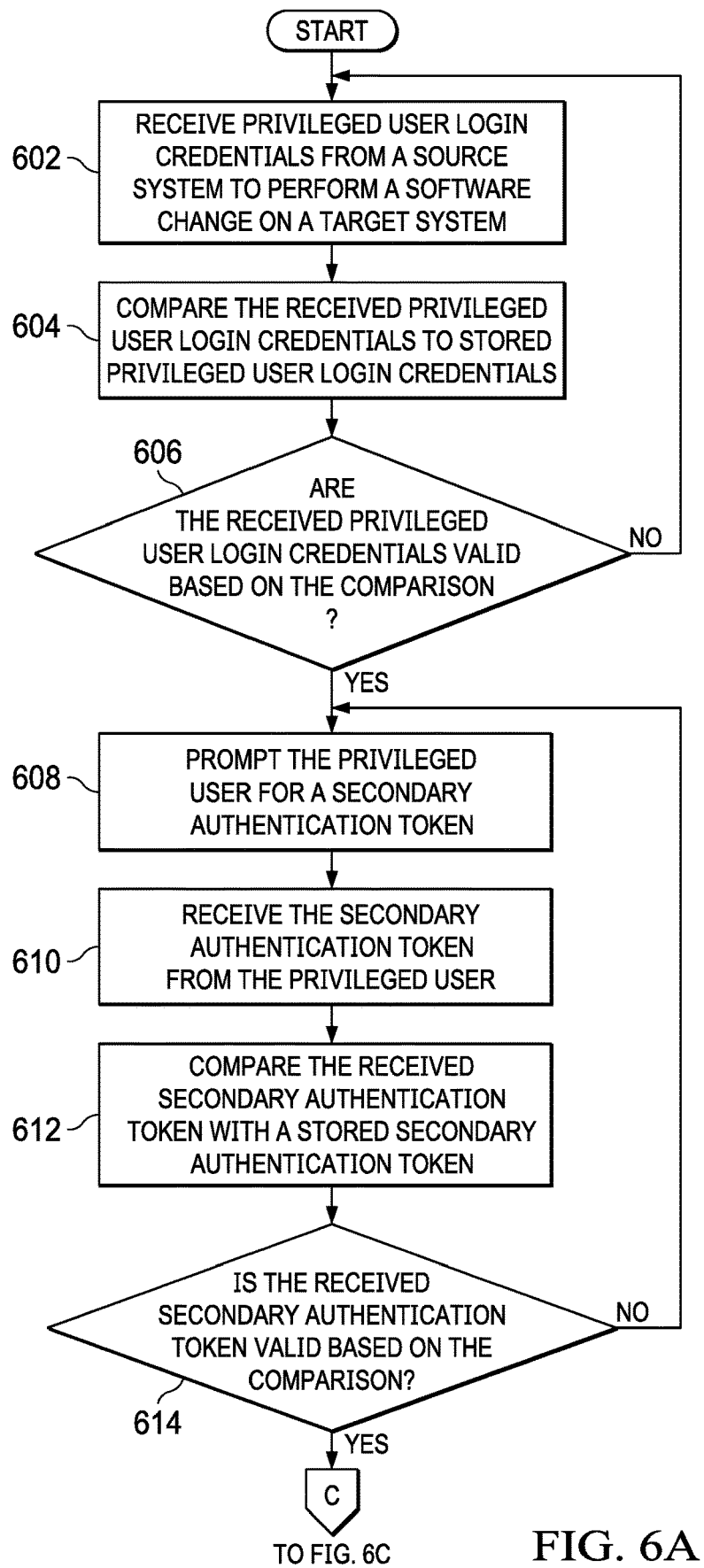
FIGS. 6A-6C are a flowchart illustrating a process for privileged user login in accordance with an illustrative embodiment.
Figure 6B:
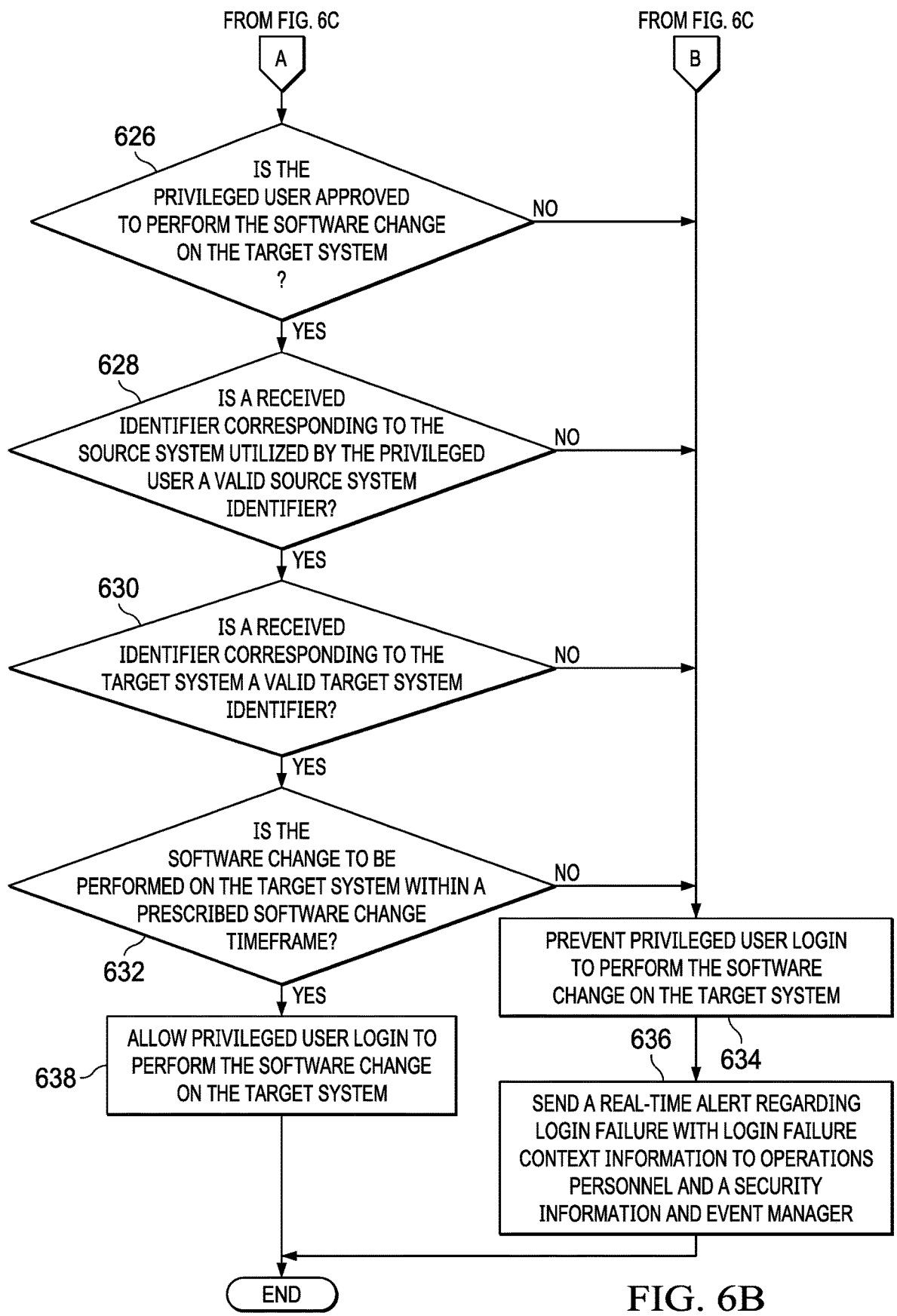
Figure 6C:
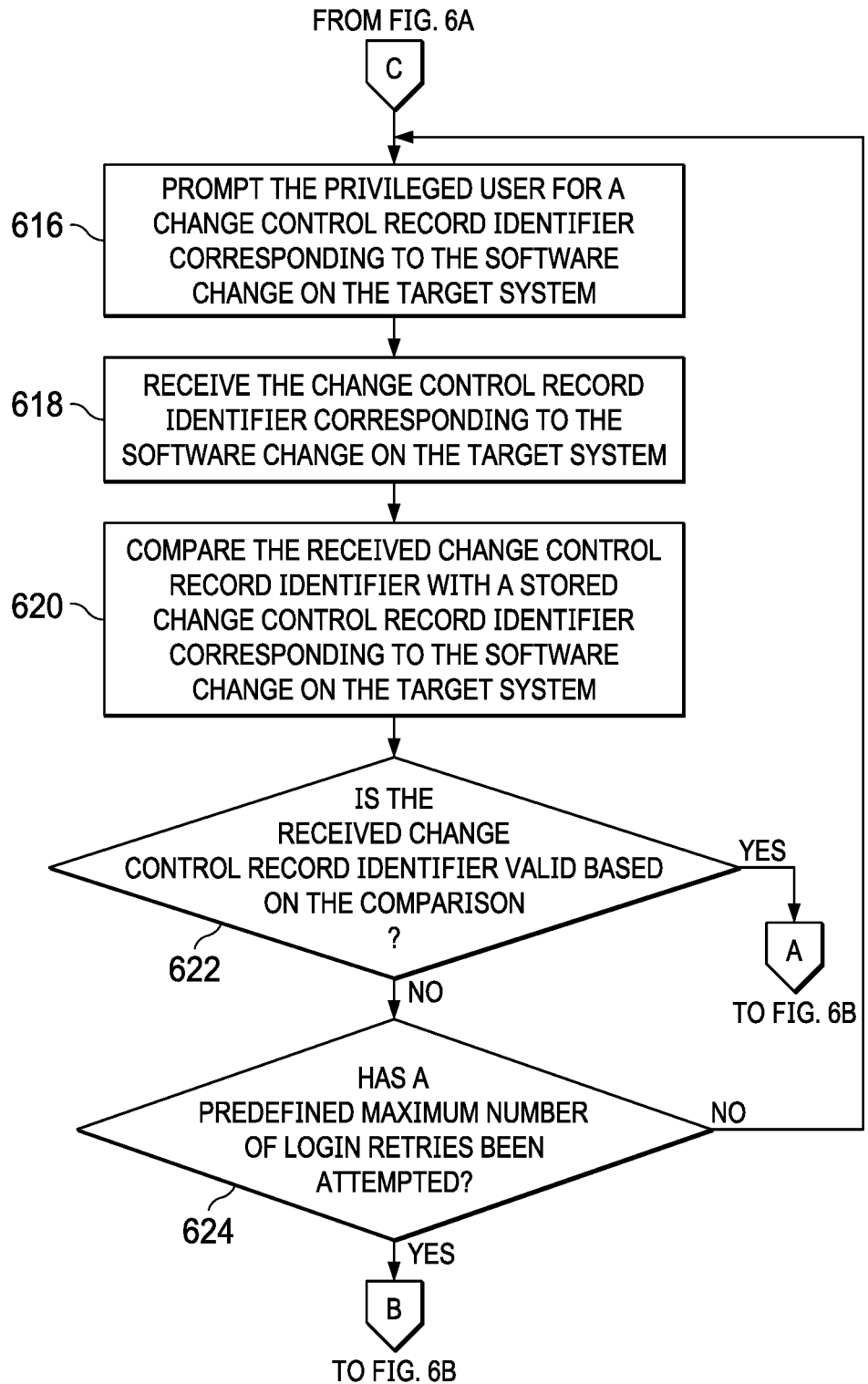

With reference now to FIGS. 6A-6C, a flowchart illustrating a process for privileged user login is shown in accordance with an illustrative embodiment. The process shown in FIGS. 6A-6C may be implemented in a change control system computer, such as, for example, server 104 in FIG. 1, data processing system 200 in FIG. 2, a cloud computing node in cloud computing nodes 310 in FIG. 3, or server 506 in FIG. 5.

The process begins when the change control system computer receives privileged user login credentials from a source system to perform a software change on a target system (step 602). The change control system computer compares the received privileged user login credentials to stored privileged user login credentials (step 604). The change control system computer makes a determination as to whether the received privileged user login credentials are valid based on the comparison (step 606).

If the change control system computer determines that the received privileged user login credentials are invalid based on the comparison, no output of step 606, then the process returns to step 602 where the change control system computer waits to receive privileged user login credentials. If the change control system computer determines that the received privileged user login credentials are valid based on the comparison, yes output of step 606, then the change control system computer prompts the privileged user for a secondary authentication token (step 608). The secondary authentication token may be, for example, a hardware token, such as a security token or security key fob, a software token, such as a cryptographic key, a security code, such as a sequence of numbers, or the like.

Subsequently, the change control system computer receives the secondary authentication token from the privileged user (step 610). The change control system computer compares the received secondary authentication token with a stored secondary authentication token (step 612). The change control system computer makes a determination as to whether the received secondary authentication token is valid based on the comparison (step 614).

If the change control system computer determines that the received secondary authentication token is invalid based on the comparison, no output of step 614, then the process returns to step 608 where the change control system computer prompts the privileged user for another secondary authentication token. If the change control system computer determines that the received secondary authentication token is valid based on the comparison, yes output of step 614, then the change control system computer prompts the privileged user for a change control record identifier corresponding to the software change on the target system (step 616).

Subsequently, the change control system computer receives the change control record identifier corresponding to the software change on the target system (step 618). The change control system computer compares the received change control record identifier with a stored change control record identifier corresponding to the software change on the target system (step 620). The stored change control record identifier may be, for example, identifier 222 of change control record 220 in FIG. 2.

The change control system computer makes a determination as to whether the received change control record identifier is valid based on the comparison (step 622). If the change control system computer determines that the received change control record identifier is invalid based on the comparison, no output of step 622, then the change control system computer makes a determination as to whether a predefined maximum number of login retries has been attempted (step 624). If the change control system computer determines that the predefined maximum number of login retries has not been attempted, no output of step 624, then the process returns to step 616 where the change control system computer prompts the privileged user for another change control record identifier. If the change control system computer determines that the predefined maximum number of login retries has been attempted, yes output of step 624, then the process proceeds to step 634.

Returning again to step 622, if the change control system computer determines that the received change control record identifier is valid based on the comparison, yes output of step 622, then the change control system computer makes a determination as to whether the privileged user is approved to perform the software change on the target system (step 626). If the change control system computer determines that the privileged user is not approved to perform the software change on the target system, no output of step 626, then the process proceeds to step 634. If the change control system computer determines that the privileged user is approved to perform the software change on the target system, yes output of step 626, then the change control system computer makes a determination as to whether a received identifier corresponding to the source system utilized by the privileged user is a valid source system identifier (step 628).

If the change control system computer determines that the received identifier corresponding to the source system utilized by the privileged user is an invalid source system identifier, no output of step 628, then the process proceeds to step 634. If the change control system computer determines that the received identifier corresponding to the source system utilized by the privileged user is a valid source system identifier, yes output of step 628, then the change control system computer makes a determination as to whether a received identifier corresponding to the target system is a valid target system identifier (step 630). If the change control system computer determines that the received identifier corresponding to the target system is an invalid target system identifier, no output of step 630, then the process proceeds to step 634. If the change control system computer determines that the received identifier corresponding to the target system is a valid target system identifier, yes output of step 630, then the change control system computer makes a determination as to whether the software change to be performed on the target system is within a prescribed software change timeframe (step 632).

If the change control system computer determines that the software change to be performed on the target system is not within the prescribed software change timeframe, no output of step 632, then the change control system computer prevents privileged user login to perform the software change on the target system (step 634). In addition, the change control system computer sends a real-time alert regarding login failure with login failure context information to operations personnel and a security information and event manager (step 636). The login failure context information may be, for example, an invalid change control record identifier was presented in excess of a predefined maximum number of login retry attempts; the privileged user was not approved to perform the software change on the target system; an invalid source system identifier was received; an invalid target system identifier was received; the software change was not going to be performed within the prescribed software change timeframe; and the like. Thereafter, the process terminates. If the change control system computer determines that the software change to be performed on the target system is within the prescribed software change timeframe, yes output of step 632, then the change control system computer allows privileged user login to perform the software change on the target system (step 638). Thereafter, the process terminates.

Figure 7A:
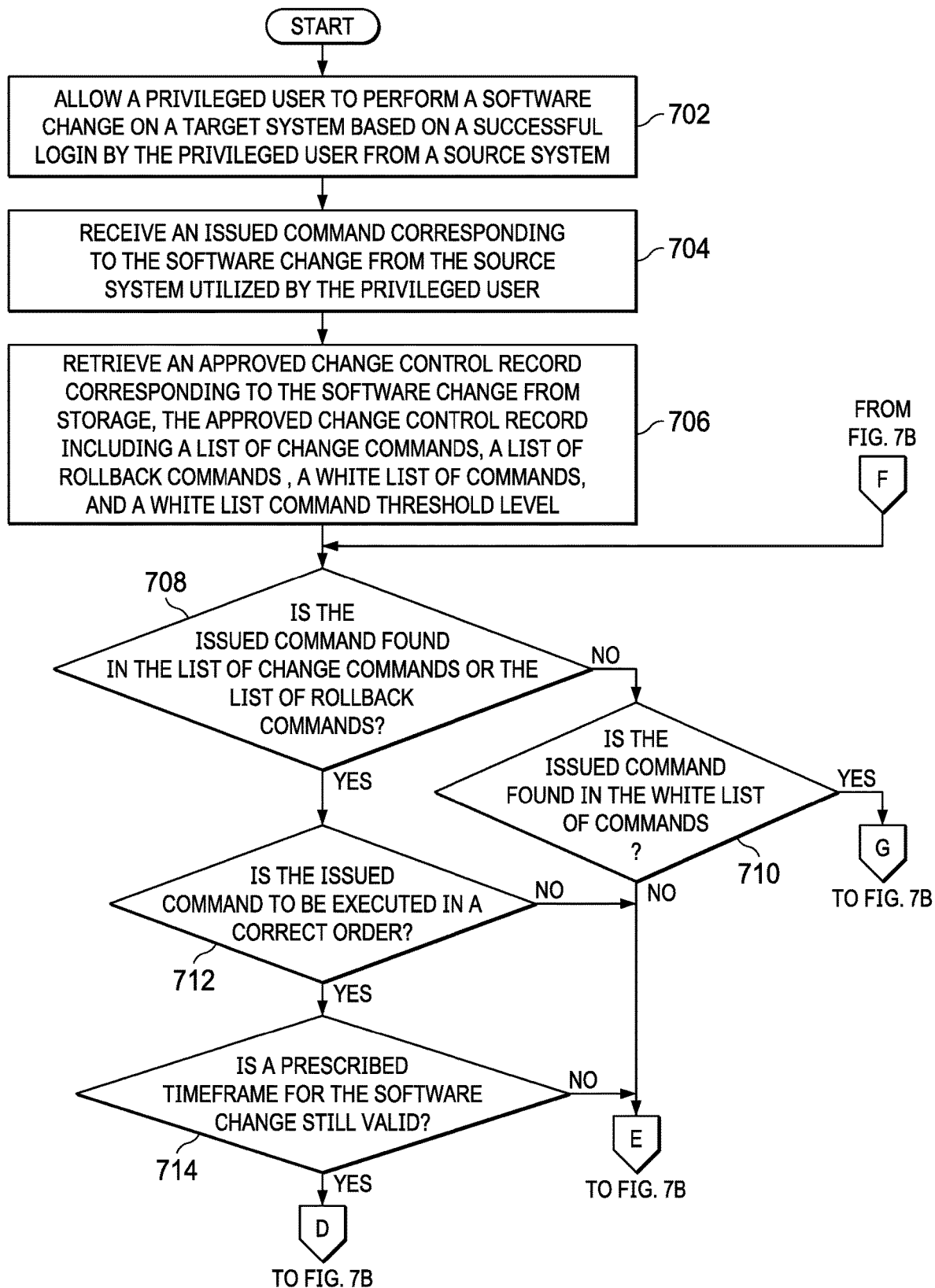
FIGS. 7A-7B are a flowchart illustrating a process for software change on a target system based on evaluation of issued commands in accordance with an illustrative embodiment.
Figure 7B:
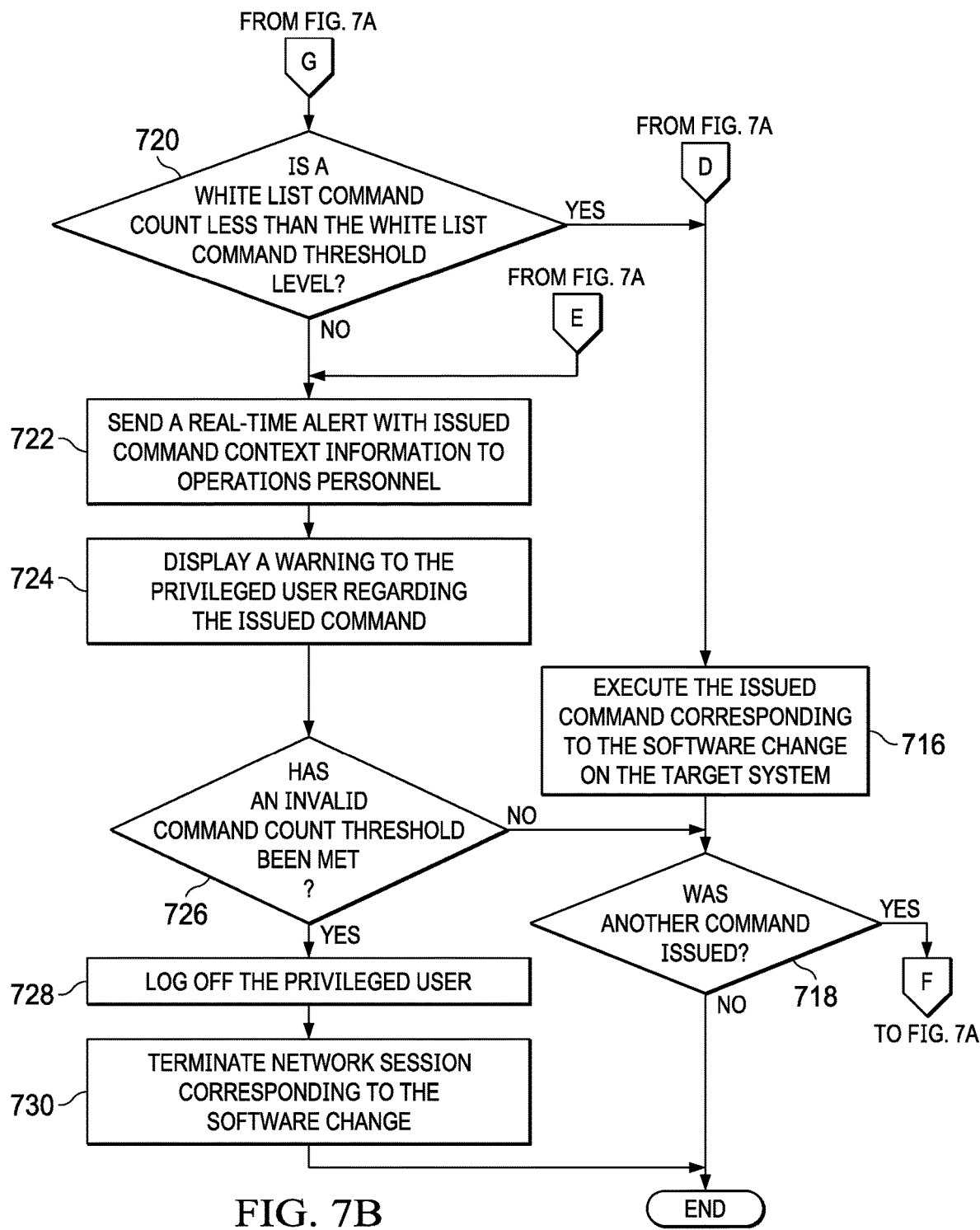

With reference now to FIGS. 7A-7B, a flowchart illustrating a process for software change on a target system based on evaluation of issued commands is shown in accordance with an illustrative embodiment. The process shown in FIGS. 7A-7B may be implemented in a change control system computer, such as, for example, server 104 in FIG. 1, data processing system 200 in FIG. 2, a cloud computing node in cloud computing nodes 310 in FIG. 3, or server 506 in FIG. 5.

The process begins when the change control system computer allows a privileged user to perform a software change on a target system based on a successful login by the privileged user from a source system (step 702). The software change may be, for example, a software upgrade or a software patch to an operating system or other software program. The target system may be, for example, target system 504 in FIG. 5. The source system may be, for example, source system 502 in FIG. 5.

Subsequently, the change control system computer receives an issued command corresponding to the software change from the source system utilized by the privileged user (step 704). Afterward, the change control system computer retrieves an approved change control record corresponding to the software change from storage (step 706). The approved change control record may be, for example, change control record 220 in FIG. 2. The approved change control record includes a list of change commands, a list of rollback commands, a white list of commands, and a white list command threshold level.

The change control system computer makes a determination as to whether the issued command is found in the list of change commands or the list of rollback commands (step 708). If the change control system computer determines that the issued command is not found in the list of change commands or the list of rollback commands, no output of step 708, then the change control system computer makes a determination as to whether the issued command is found in the white list of commands (step 710). If the change control system computer determines that the issued command is not found in the white list of commands, no output of step 710, then the process proceeds to step 722. Returning again to step 708, if the change control system computer determines that the issued command is found in the list of change commands or the list of rollback commands, yes output of step 708, then the change control system computer makes a determination as to whether the issued command is to be executed in a correct order (step 712).

If the change control system computer determines that the issued command will not be executed in the correct order, no output of step 712, then the process proceeds to step 722. If the change control system computer determines that the issued command will be executed in the correct order, yes output of step 712, then the change control system computer makes a determination as to whether a prescribed timeframe for the software change is still valid (step 714). If the change control system computer determines that the prescribed timeframe for the software change is not still valid, no output of step 714, then the process proceeds to step 722. If the change control system computer determines that the prescribed timeframe for the software change is still valid, yes output of step 714, then the change control system computer executes the issued command corresponding to the software change on the target system (step 716).

Afterward, the change control system computer makes a determination as to whether another command was issued from the source system by the privileged user (step 718). If the change control system computer determines that another command was issued from the source system, yes output of step 718, then the process returns to step 708 where the change control system computer makes a determination as to whether the newly issued command is found in the list of change commands or the list of rollback commands. If the change control system computer determines that another command was not issued from the source system, no output of step 718, then the process terminates thereafter.

Returning again to step 710, if the change control system computer determines that the issued command is found in the white list of commands, yes output of step 710, then the change control system computer makes a determination as to whether a white list command count is less than the white list command threshold level (step 720). If the change control system computer determines that the white list command count is less than the white list command threshold level, yes output of step 720, then the process returns to step 716 where the change control system computer executes the issued command. If the change control system computer determines that the white list command count is greater than the white list command threshold level, no output of step 720, then the change control system computer sends a real-time alert with issued command context information to operations personnel and a security information and event manager (step 722). The issued command context information may be, for example, the issued command was not found in the change command list, rollback command list, or white list of supplemental commands; the issued command exceeded the white list command count threshold; the issued command was not going to be executed in the correct order; the issued command was going to be executed outside the prescribed timeframe for the software change; and the like. Also, the change control system computer displays a warning to the privileged user on the source system regarding the issued command (step 724).

Further, the change control system computer makes a determination as to whether an invalid command count threshold has been met (step 726). An invalid command may be, for example, an issued command that was not be found in the list of change commands, the list of rollback commands, or the white list of commands. In addition, an invalid command may be an issued command that would be executed out of a correct sequence. The threshold for the number of invalid commands may be any predefined threshold number, such as, for example, 1, 2, 3, 4, 5, 10, 20, or the like.

If the change control system computer determines that the invalid command count threshold has not been met, no output of step 726, then the process returns to step 718 where the change control system computer makes a determination as to whether another command has been issued from the source system. If the change control system computer determines that the invalid command count threshold has been met, yes output of step 726, then the change control system computer logs off the privileged user (step 728). Furthermore, the change control system computer terminates the network session corresponding to the software change (step 730). Thereafter, the process terminates.

Figure 8:
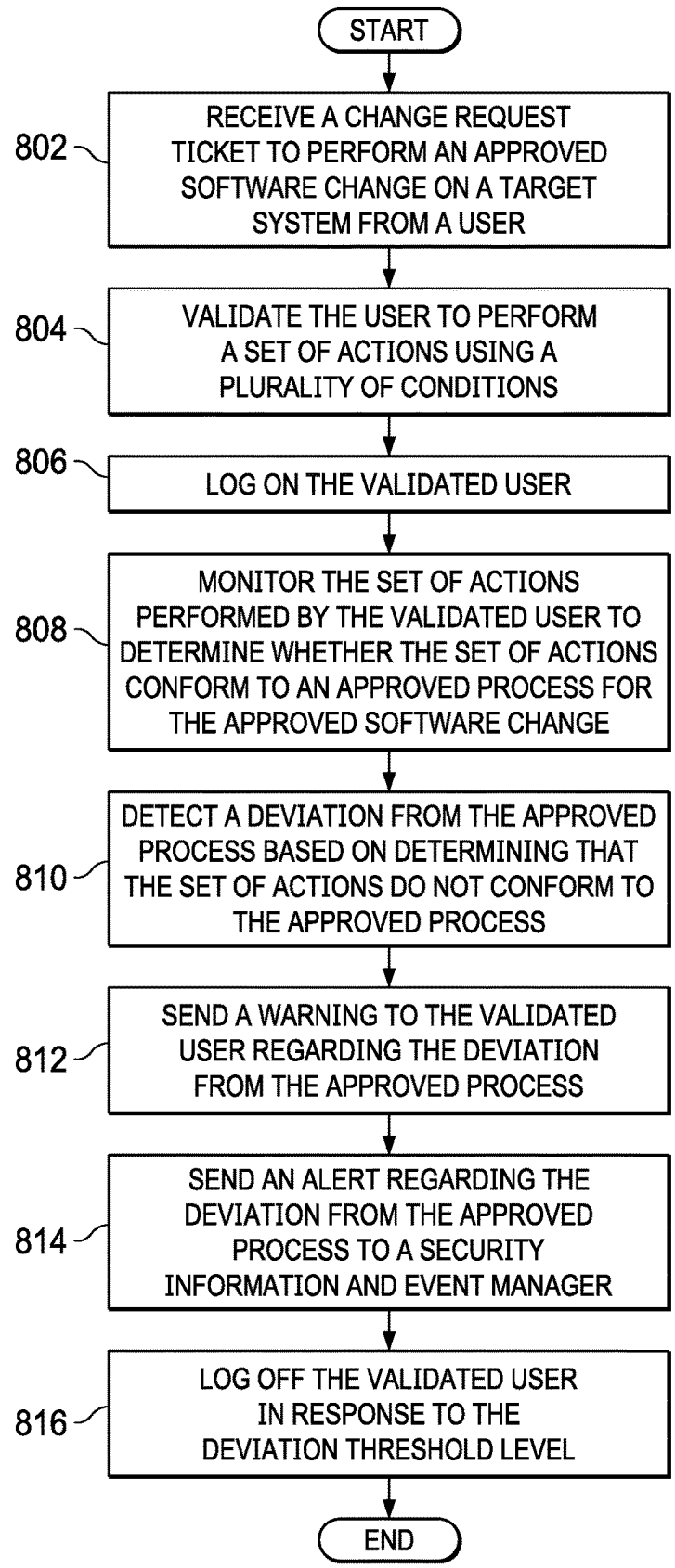
FIG. 8 is a flowchart illustrating a process for enforcing authorization controls for an approved software change in accordance with an illustrative embodiment.

With reference now to FIG. 8, a flowchart illustrating a process for enforcing authorization controls for an approved software change is shown in accordance with an illustrative embodiment. The process shown in FIG. 8 may be implemented in a change control system computer, such as, for example, server 104 in FIG. 1, data processing system 200 in FIG. 2, a cloud computing node in cloud computing nodes 310 in FIG. 3, or server 506 in FIG. 5.

The process begins when the change control system computer receives a change request ticket to perform an approved software change on a target system from a user (step 802). The target system may be, for example, target system 504 in FIG. 5. The user may be, for example, a privileged user, such as a system administrator, security analyst, or the like.

After receiving the request in step 802, the change control system computer validates that the user is authorized to perform a set of actions (step 804). The change control system computer validates the user utilizing a plurality of conditions that may include, for example, input of valid login credentials, such as username and password, and input of a valid secondary authentication token, such as hardware security token. The plurality of conditions may also include input of a valid change control record identifier, a valid user identifier, a valid source system identifier, a correct target system identifier, a valid timeframe for the approved software change, and the like, within the change request ticket. Then, after validating the user, the change control system computer logs on the validated user (step 806).

The change control system computer monitors the set of actions performed by the validated user to determine whether the set of actions conform to an approved process for the approved software change (step 808). The set of actions is issuing one or more commands corresponding to the software change on the target system. The approved process is an approved change control record that contains at least one of a list of previously tested change commands corresponding to the software change, a list of rollback commands in case the software change is unsuccessful, and a white list of supplemental commands.

The change control system computer detects a deviation from the approved process based on determining that the set of actions do not conform to the approved process during the monitoring (step 810). In response to detecting the deviation, the change control system computer sends a warning to the validated user regarding the deviation from the approved process (step 812). In addition, the change control system computer sends an alert regarding the deviation from the approved process to a security information and event manager (step 814). Moreover, the change control system computer logs off the validated user in response to the deviation exceeding a deviation threshold level (step 816). Thereafter, the process terminates.

Thus, illustrative embodiments of the present invention provide a computer-implemented method, computer system, and computer program product for enforcing authorization controls for an approved software change on a target system using an identifier of a change control record corresponding to the approved software change and other information contained in the change control record. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for enforcing authorization controls for an approved software change on a target system, the method comprising:
   validating that a user is authorized to perform a set of actions;
   monitoring the set of actions performed by the validated user to determine whether the set of actions conform to an approved process for the approved software change on the target system;
   detecting a deviation from the approved process based on determining that the set of actions do not conform to the approved process during the monitoring; and
   responsive to detecting the deviation from the approved process, sending an alert regarding the deviation.

2. The method of claim 1 further comprising:
   responsive to detecting the deviation from the approved process, sending a warning to the validated user regarding the deviation.

3. The method of claim 1 further comprising:
   logging off the validated user in response to the deviation exceeding a deviation threshold level.

4. The method of claim 1, wherein the user is validated using a plurality of conditions that includes at least one of a valid change control record identifier, a valid user identifier, a correct target system identifier, a valid source system identifier, and a valid software change timeframe within a change request ticket corresponding to the approved software change on the target system.

5. The method of claim 1, wherein the set of actions is issuing one or more commands corresponding to the approved software change on the target system.

6. The method of claim 1, wherein the approved process is an approved change control record that contains at least one of a list of tested change commands corresponding to the approved software change, a list of rollback commands, and a white list of commands.

7. The method of claim 1, wherein the alert is sent to a security information and event manager.

8. The method of claim 1 further comprising:
   receiving an issued command corresponding to the approved software change on the target system from a source system corresponding to the validated user;
   determining whether the issued command is found in a list of change commands contained in a change control record corresponding to the approved software change;
   responsive to determining that the issued command is found in the list of change commands, determining whether the issued command is to be executed in a correct order;
   responsive to determining that the issued command will be executed in the correct order, determining whether a prescribed timeframe for the approved software change is valid; and
   responsive to determining that the prescribed timeframe for the approved software change is valid, executing the issued command corresponding to the approved software change on the target system.

9. The method of claim 8 further comprising:
   responsive to determining that the issued command is not found in the list of change commands, determining whether the issued command is found in a white list of commands;
   responsive to determining that the issued command is found in the white list of commands, determining whether a white list command count is less than a white list command threshold level; and
   responsive to determining that the white list command count is less than the white list command threshold level, executing the issued command.

10. A computer system for enforcing authorization controls for an approved software change on a target system, the computer system comprising:

a bus system;

a storage device connected to the bus system, wherein the storage device stores program instructions; and a processor connected to the bus system, wherein the processor executes the program instructions to:

validate that a user is authorized to perform a set of actions;

monitor the set of actions performed by the validated user to determine whether the set of actions conform to an approved process for the approved software change on the target system;

detect a deviation from the approved process based on determining that the set of actions do not conform to the approved process during the monitoring; and send an alert regarding the deviation from the approved process in response to detecting the deviation.

11. The computer system of claim 10, wherein the processor further executes the program instructions to:

send a warning to the validated user regarding the deviation from the approved process in response to detecting the deviation.

12. The computer system of claim 10, wherein the processor further executes the program instructions to:

log off the validated user in response to the deviation exceeding a deviation threshold level.

13. The computer system of claim 10, wherein the user is validated using a plurality of conditions that includes at least one of a valid change control record identifier, a valid user identifier, a correct target system identifier, a valid source system identifier, and a valid software change timeframe within a change request ticket corresponding to the approved software change on the target system.

14. The computer system of claim 10, wherein the set of actions is issuing one or more commands corresponding to the approved software change on the target system.

15. A computer program product for enforcing authorization controls for an approved software change on a target system, the computer program product comprising a computer readable storage medium having program instructions embodied therewith, the program instructions executable by a computer to cause the computer to perform a method comprising:

validating that a user is authorized to perform a set of actions;

monitoring the set of actions performed by the validated user to determine whether the set of actions conform to an approved process for the approved software change on the target system;

detecting a deviation from the approved process based on determining that the set of actions do not conform to the approved process during the monitoring; and responsive to detecting the deviation from the approved process, sending an alert regarding the deviation.

16. The computer program product of claim 15 further comprising:

responsive to detecting the deviation from the approved process, sending a warning to the validated user regarding the deviation.

17. The computer program product of claim 15 further comprising:

logging off the validated user in response to the deviation exceeding a deviation threshold level.

18. The computer program product of claim 15, wherein the user is validated using a plurality of conditions that includes at least one of a valid change control record identifier, a valid user identifier, a correct target system identifier, a valid source system identifier, and a valid software change timeframe within a change request ticket corresponding to the approved software change on the target system.

19. The computer program product of claim 15, wherein the set of actions is issuing one or more commands corresponding to the approved software change on the target system.

20. The computer program product of claim 15, wherein the approved process is an approved change control record that contains at least one of a list of tested change commands corresponding to the approved software change, a list of rollback commands, and a white list of commands.

\* \* \* \* \*